(12) United States Patent
Aron

(10) Patent No.: US 8,313,114 B1
(45) Date of Patent: Nov. 20, 2012

(54) SHOPPING CART CADDY

(76) Inventor: Kurt Aron, Boca Raton, FL (US)

( * ) Notice: Subject to any disclaimer, the term of this patent is extended or adjusted under 35 U.S.C. 154(b) by 0 days.

(21) Appl. No.: 13/117,916

(22) Filed: May 27, 2011

Related U.S. Application Data (60) Provisional application No. 61/349,403, filed on May 28, 2010.

(51) Int. Cl.
*B62D 39/00* (2006.01)

(52) U.S. Cl. .......... 280/33.992; 280/33.991; 280/33.997

(58) Field of Classification Search .......... 280/33.991, 280/33.992, DIG. 4; 224/926, 411, 414, 224/425, 433–434; 248/311.2, 312.1, 316.2, 248/316.6

See application file for complete search history.

(56) References Cited

U.S. PATENT DOCUMENTS

| | | |
|---|---|---|
| D257,113 S | 9/1980 | McCaffrey |
| 4,376,502 A | 3/1983 | Cohen |
| 4,643,280 A | 2/1987 | Hensley |
| 4,685,701 A | 8/1987 | Amundson et al. |
| 4,702,402 A | 10/1987 | Ferri |
| 4,901,901 A | 2/1990 | Reitenour |
| 5,012,966 A | 5/1991 | Turner et al. |
| 5,086,960 A | 2/1992 | Schwietzer |
| 5,176,392 A | 1/1993 | Graebe, Jr. |
| 5,494,306 A | 2/1996 | Adamson et al. |
| 5,494,308 A | 2/1996 | Southerland |
| 5,791,669 A | 8/1998 | Broddon et al. |
| 5,836,596 A | 11/1998 | Wanzl |
| 6,029,380 A | 2/2000 | Goddard |
| 6,056,178 A | 5/2000 | Rapp-Duncan |
| D435,196 S * | 12/2000 | Gregor et al. ............... D7/552.1 |
| 6,186,382 B1 | 2/2001 | Bergin et al. |
| 6,231,058 B1 | 5/2001 | Kimbrough et al. |
| 6,354,612 B1 | 3/2002 | Adamson |
| 7,134,674 B2 | 11/2006 | Frommherz |
| D536,502 S | 2/2007 | Weigand et al. |
| 7,384,049 B2 | 6/2008 | Peota et al. |
| 8,056,909 B2 * | 11/2011 | Burdwood et al. ...... 280/33.991 |
| 2006/0022005 A1 | 2/2006 | Chadwick |
| 2006/0049591 A1 | 3/2006 | Pennell |

* cited by examiner

*Primary Examiner* — John Walters
*Assistant Examiner* — James Triggs
(74) *Attorney, Agent, or Firm* — Gold & Rizvi, P.A.; Glenn E. Gold; H. John Rizvi (57) ABSTRACT

A shopping cart caddy body having a pair of elongated opposing edges and a pair of short edges spanning therebetween. A pair of coupling formations are incorporated proximate each lateral end of the body for affixing the body to a shopping cart. The coupling formation includes a support along each of the two lateral edges and along at least one longitudinal edge. A pair of cup holders are formed into the body, each cup holder being located proximate a respective lateral end of the body. The cup holders are sized, shaped, and located providing clearance for the insertion of a second cart into a cart nesting opening.

20 Claims, 9 Drawing Sheets

SHOPPING CART CADDY

CROSS-REFERENCE TO RELATED APPLICATION

This Non-Provisional Utility application claims the benefit of co-pending U.S. Provisional Patent Application Ser. No. 61/349,403, filed on May 28, 2010, which is incorporated herein in its entirety.

FIELD OF THE INVENTION

The present disclosure generally relates to a storage caddy for a shopping cart. More particularly, the present disclosure relates to a caddy comprising body formed incorporating an interface for coupling to a handle portion of a shopping cart, a pair of cup holders, and an elongated storage tray.

BACKGROUND OF THE INVENTION

The present invention provides a caddy designed to attach to a handle portion of a shopping card, the caddy being used to holding objects such as drinks and miscellaneous items.

Consumers use shopping carts to aid in the gathering and conveyance of goods. Modern shopping carts comprise a basket supported by a frame. A set of wheels provides portability to the cart. Each wheel is individually attached to a lower portion of the frame via an axle. Two of the wheels are supported via a pivot mechanism, allowing for steering of the cart. A child's seat may be integrated into the cart. The carts are designed to be horizontally sleeve into one another for mass transport and storage.

The child's seat is integrated with a pivotal rear wall portion of the basket. The rear wall pivots upward creating the clearance for insertion of a second cart. When a child is not seated in the child seat, the seat is used to stow goods.

The cart and seat support are normally fabricated of a loose metal mesh. The configuration of the cart is not conducive to holding small items, such as a shopping list, a writing utensil, drinks, and the like.

What is desired is a device to aid a consumer during a shopping experience, the device being integrated into a shopping cart for holding drinks and small items.

SUMMARY OF THE INVENTION

The basic inventive concept provides a caddy that is assembled to a handle portion of a shopping cart. The exemplary caddy includes a pair of drink holder's positioned proximate two lateral corners.

A first aspect of the present invention provides a shopping cart caddy comprising:

a caddy body having a pair of elongated edges and a pair of short edges arranged perpendicular to and spanning between the pair of elongated edges;

a lateral coupling formation formed along a rear elongated edge of the body, the lateral coupling formation having a size, shape, and orientation to be adapted to a rear segment of a shopping cart handle;

at least one longitudinal coupling formation formed along at least one of the short edges of the body, the at least one longitudinal coupling formation having a size, shape, and orientation to be adapted to a side segment of a shopping cart handle; and a storage container formed within the edges of the body.

A second aspect of the present invention incorporates at least one (1) cup holder within the body.

In yet another aspect, at least one cup holder is formed proximate one or both lateral ends of the body.

While in another aspect, a tray recess is integrated into the body. The tray recess is preferably elongated and centrally located within the body.

And in another aspect, the caddy further comprises a pair of longitudinal coupling formations provided along each of the short edges of the body.

With another aspect incorporates the longitudinal coupling formations and the lateral coupling formations, wherein the coupling formations adhere to a contour of the cart handle. The coupling formations can be provided having a "C" shaped cross sectional shape, enabling the cart handle to be inserted therethrough and become seated within an attachment region thereof.

In another aspect, the body is fabricated of a single piece, molded plastic body.

In yet another aspect, the cup holders are spaced allowing passage of a second cart therebetween, into a cart nesting opening.

And in another aspect, the shopping cart caddy further comprises at least one drainage orifice located through a base portion of at least one of the cup holder and the tray recess.

Another aspect incorporates a shaped cup holder to accommodate a variety of cup sizes and shapes. An exemplary cup holder can include a reduced diameter cup holder section integrated into a lower portion of the cup holder. The sidewalls of the cup holder may be parallel or tapered.

In yet another aspect, one or a pair of hand clearances can be integrated into the cart caddy assembly. The hand clearances would be located for optimal positioning of hands of an individual pushing the cart. The lateral coupling formation can be enhanced with the inclusion of a series of finger registration ridge to increase comfort to the individual pushing the cart.

With another aspect incorporating an organizer, wherein the organizer includes a shallow cavity temporarily sealed by and accessible through an openable organizer cover.

These and other advantages of the invention will be further understood and appreciated by those skilled in the art by reference to the following written specification, claims and appended drawings.

BRIEF DESCRIPTION OF THE DRAWINGS

The invention will now be described, by way of example, with reference to the accompanying drawings, where like numerals denote like elements and in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper", "lower", "left", "rear", "right", "front", "vertical", "horizontal", and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
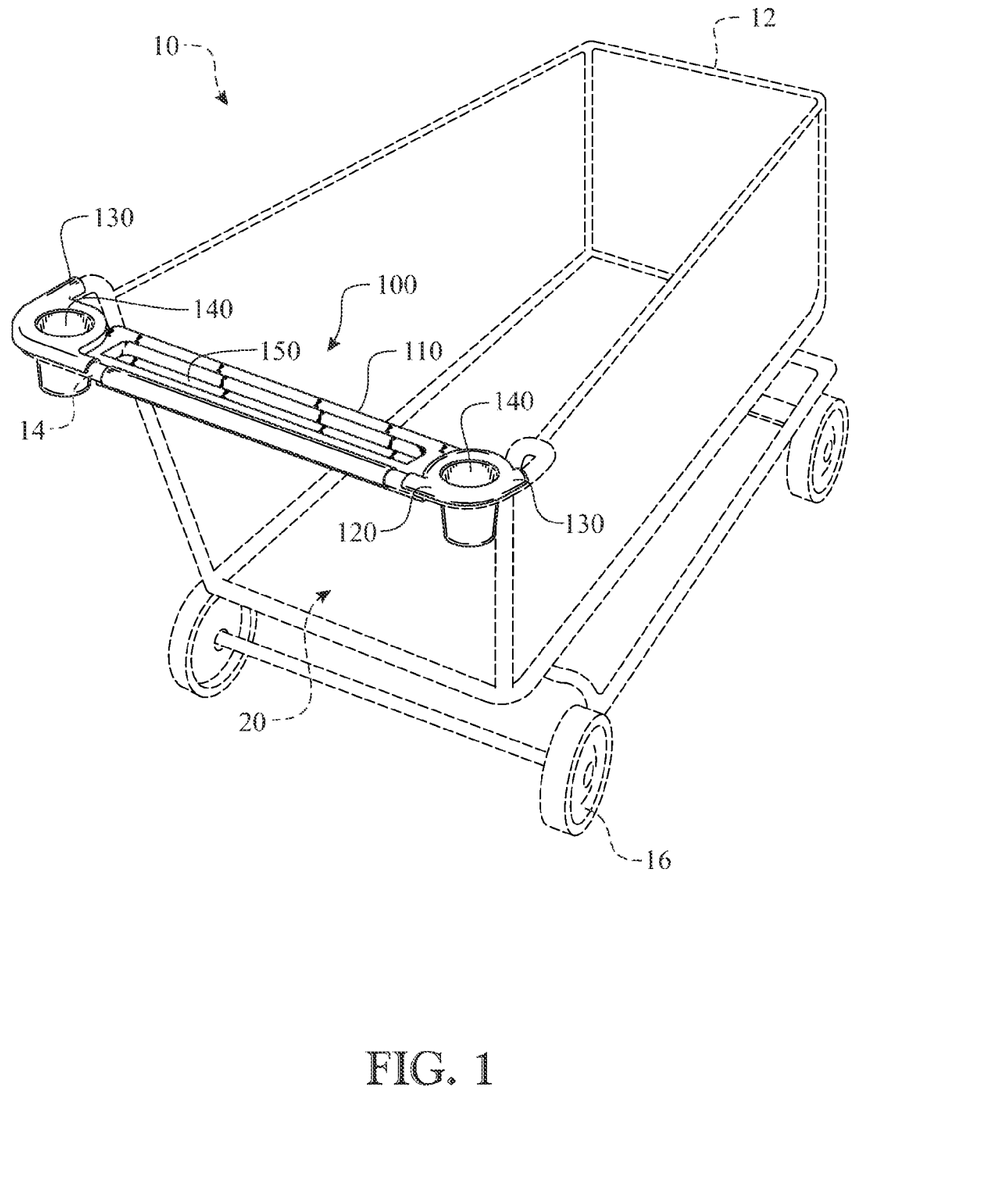
FIG. 1 presents an isometric view of a first exemplary cart caddy assembly as assembled onto a shopping cart in accordance with an exemplary embodiment of the present invention.
Figure 2:
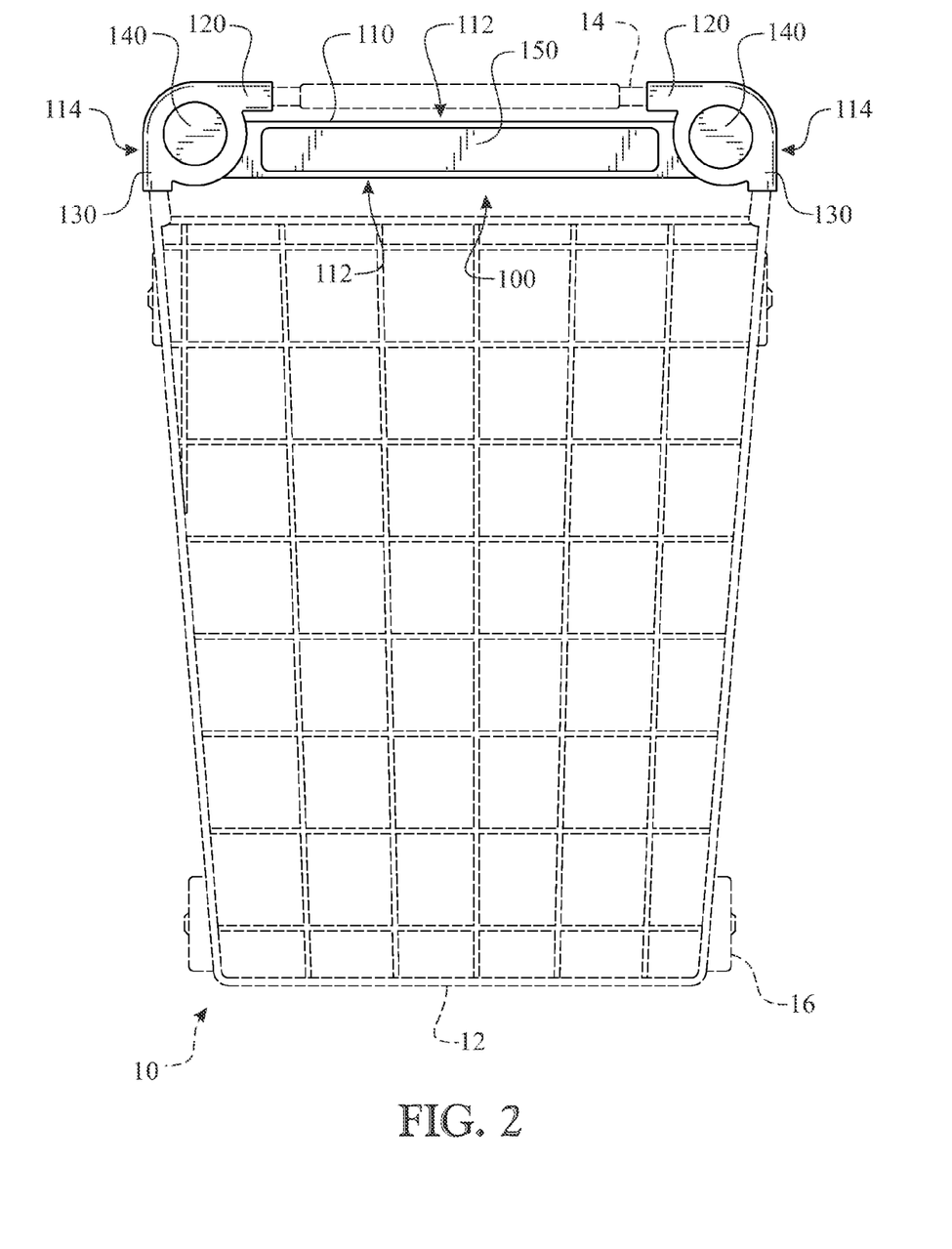
FIG. 2 presents a top view of the cart caddy assembly of FIG. 1.
Figure 3:
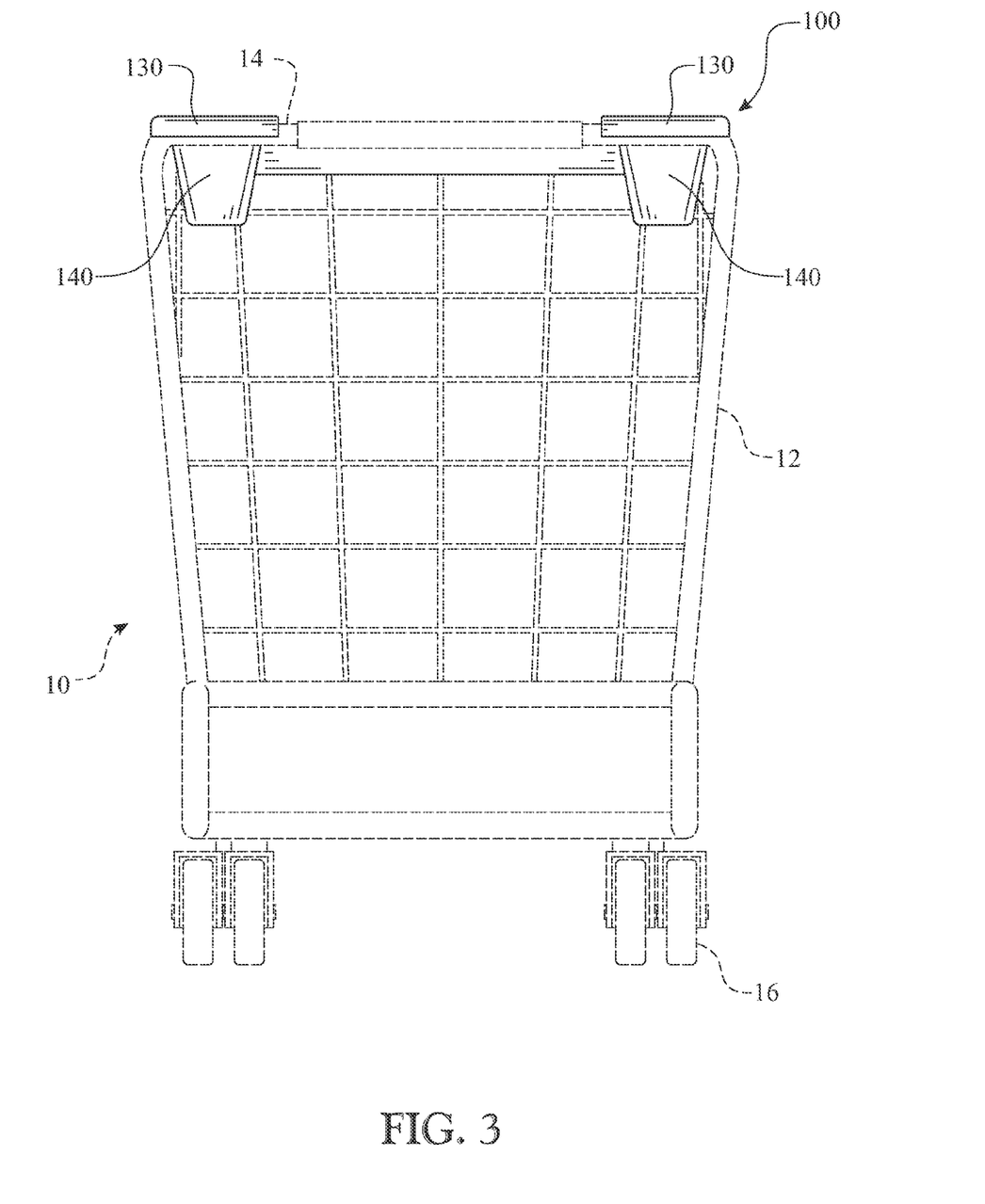
FIG. 3 presents a rear elevation view of the cart caddy assembly of FIG. 1.
Figure 4:
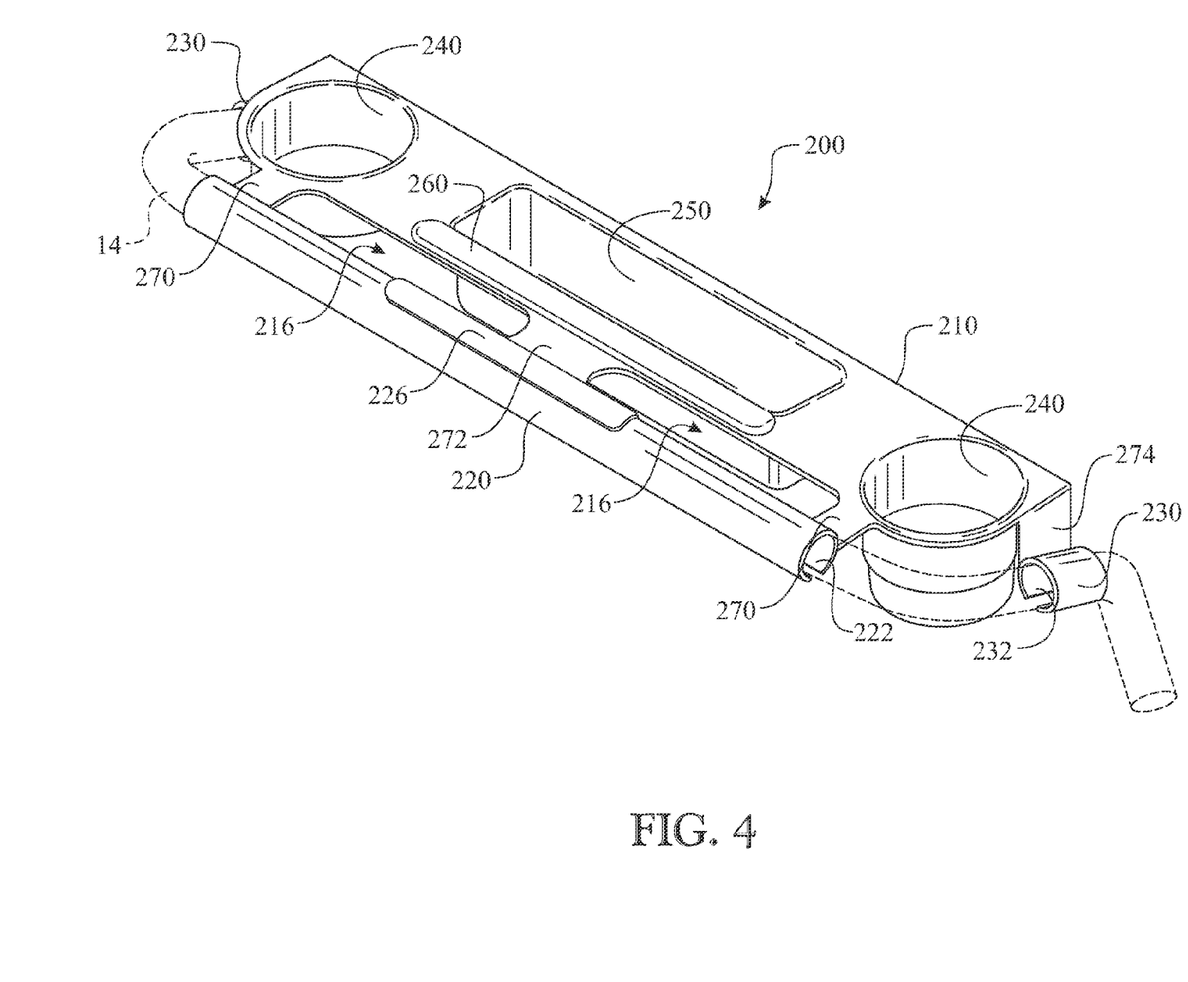
FIG. 4 presents an isometric view of a second exemplary cart caddy assembly.
Figure 5:
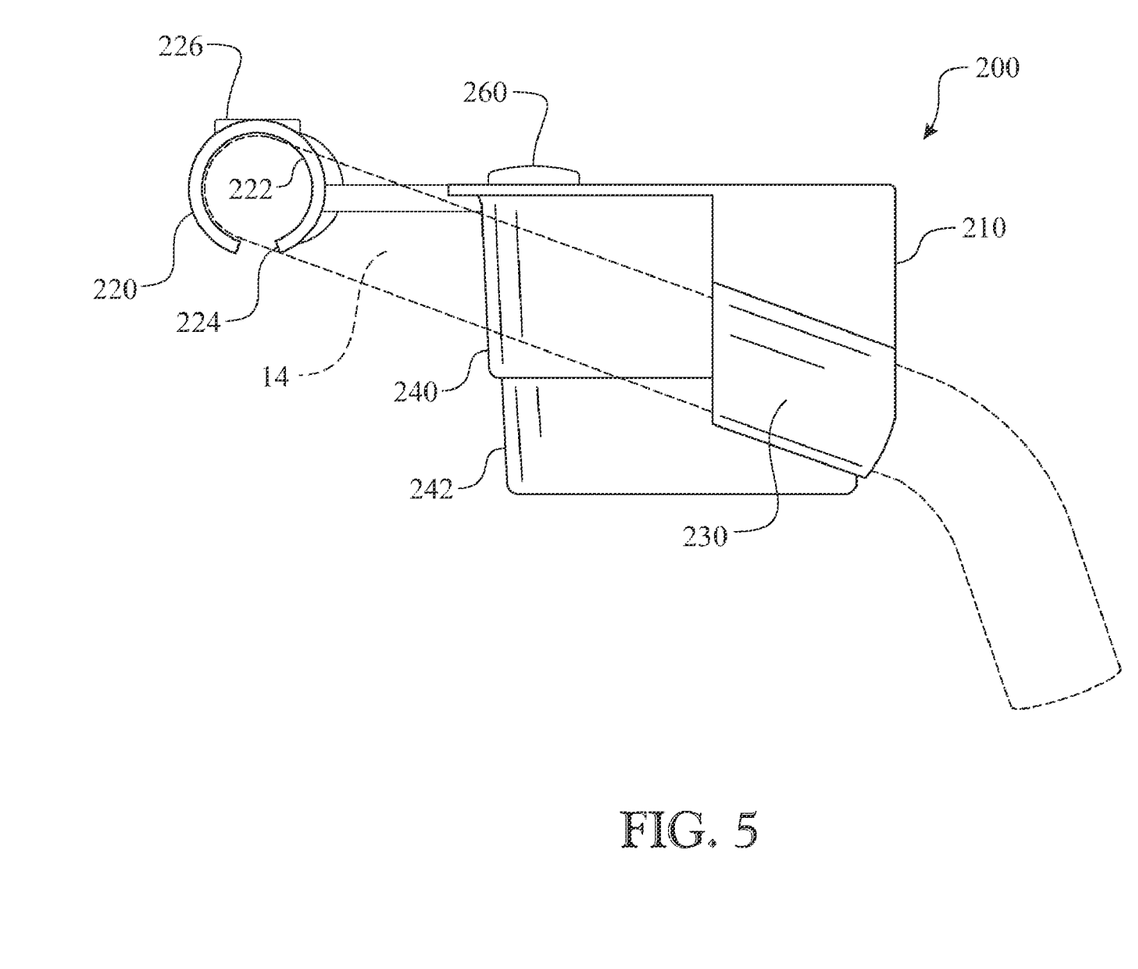
FIG. 5 presents a side elevation view of the cart caddy assembly of FIG. 4.
Figure 6:
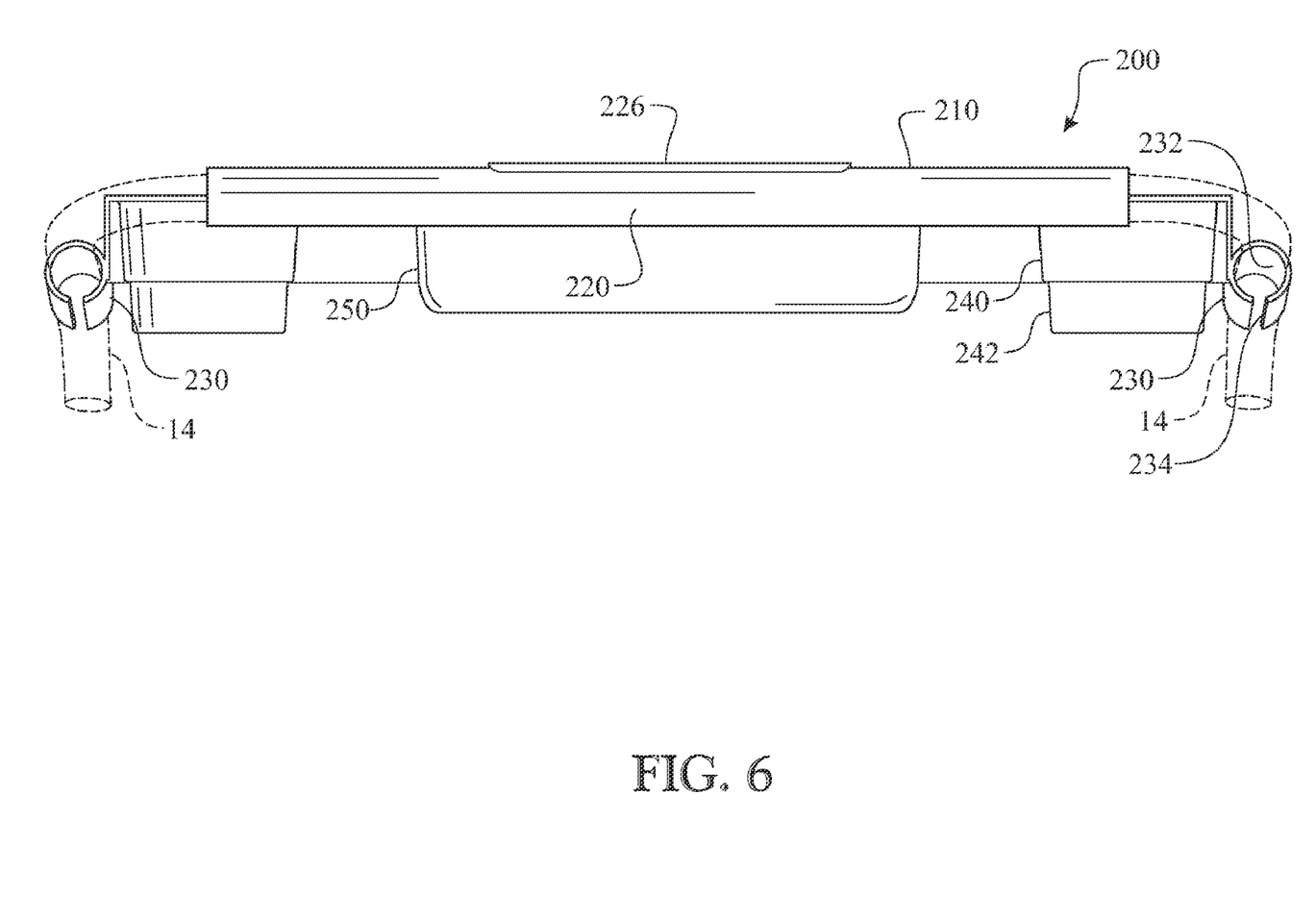
FIG. 6 presents a rear elevation view of the cart caddy assembly of FIG. 2.
Figure 7:
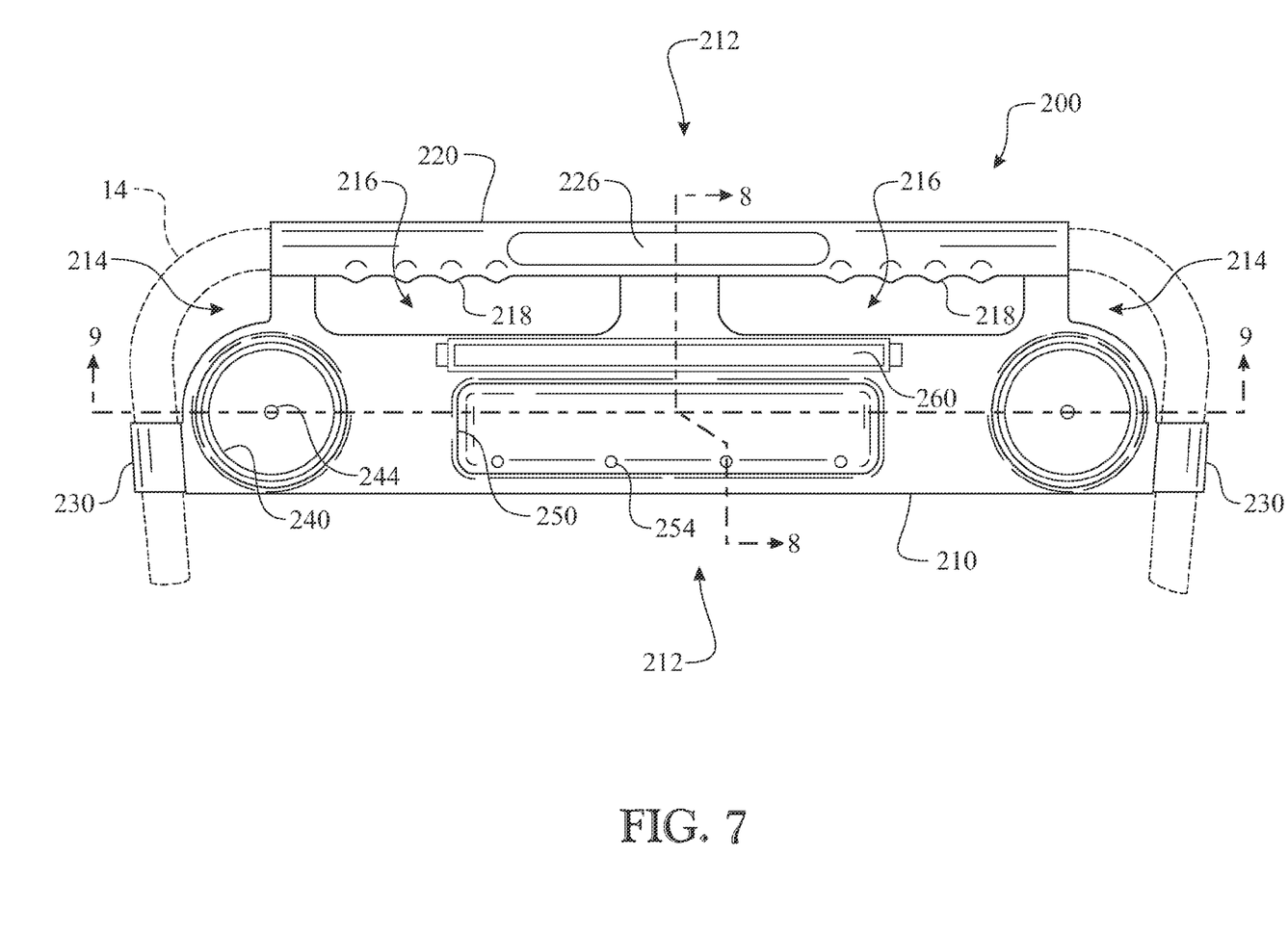
FIG. 7 presents a top view of the cart caddy assembly of FIG. 2.

A first exemplary embodiment of a cart caddy assembly 100 is illustrated and detailed in FIGS. 1 through 3. The cart caddy assembly 100 is assembled to a cart handle 14 of a shopping cart 10. The shopping cart comprises the common elements, including a cart handle 14 attached to a cart body 12 and/or cart frame (not identified). A set of cart wheels 16 are attached to the base of the cart body 12 and/or cart frame providing mobility and steering to the cart 10. The cart caddy assembly 100 is fabricated of a cart caddy body 110. The cart caddy body 110 is defined by a pair of elongated edges 112 spanning along each outer edge of the cart caddy body 110 at a parallel relationship to a lateral axis (side-side) of the shopping cart 10. The cart caddy body 110 is further defined by a pair of short edges 114 spanning along each outer edge of the cart caddy body 110 at a parallel relationship to a longitudinal axis (front-rear) of the shopping cart 10. The cart caddy body 110 is secured to the cart handle 14 via a coupling formation formed within each of the lateral ends of the cart caddy body 110. The coupling formation can be of any reasonable configuration, wherein the coupling formation adequately supports the cart caddy assembly 100 within the shopping cart 10.

The exemplary embodiment provides a coupling formation that adheres to the contour of each outer corner of the cart handle 14. The coupling formation can be described as having a lateral coupling formation 120, which secures to a portion of the cart handle 14 that is parallel to the lateral axis of the shopping cart 10 and a longitudinal coupling formation 130, which secures to a portion of the cart handle 14 that is generally parallel to the longitudinal axis of the shopping cart 10. In the illustrated exemplary embodiment, the lateral coupling formation 120 and longitudinal coupling formation 130 are blended together contouring about an arc of the cart handle 14. The configuration of the lateral coupling formation 120 and longitudinal coupling formation 130 forms sufficient support to maintain the cart caddy body 110 in the desired orientation. The coupling formations 120, 130 can be secured via a snap-fit about the cart handle 14, a two piece configuration that is mechanically secured about a diameter of the cart handle 14, fastened by a mechanical fastener such as rivets, threaded fasteners, adhesive, and the like.

The exemplary cart caddy assembly 100 includes a pair of cup holders 140 formed proximate each of two lateral ends of the cart caddy body 110. The cup holder 140 can be of any reasonable shape and including any tolerance compensating devices to ensure a cup remain steadfast within the respective cup holder 140. The cup holders 140 are preferably sized, shaped, and positioned providing clearance for a second cart to be nested through the cart interlacing opening 20, within the shopping cart 10.

A tray recess 150 can be a recess formed along the elongated portion of the cart caddy body 110 between the two (2) cup holders 140. The tray recess 150 can be of any size and shape, but preferably of a depth that avoids interference with a nesting cart being inserted through the cart interlacing opening 20. The recess provides a container for receiving shopping lists, writing utensils, tissues, napkins, toys, small goods being purchased, and the like.

The cart caddy body 110 is preferably fabricated of a molded or formed plastic material. The cart caddy body 110 can be fabricated as a single unit or by assembling a plurality of subcomponents. The material can be treated to be antimicrobial. Drainage ports can be provided through the bottom surfaces of the cup holder 140 and/or tray recess 150.

A second exemplary embodiment of a cart caddy assembly 200 is illustrated and detailed in FIGS. 4 through 9. The cart caddy assembly 200 is assembled to the cart handle 14 of the shopping cart 10. The cart caddy assembly 200 is fabricated having a cart caddy body 210. The cart caddy body 210 is formed comprising functional features for mounting to the cart handle 14, retaining a drink container, and retaining small items.

The cart caddy assembly 200 includes a lateral coupling formation 220 having a transverse orientation parallel to an elongated edge 212 along a rear portion thereof. The lateral coupling formation 220 is preferably designed having a "C" shaped cross section. The "C" shape is defined by a circular or elliptical shape having a lateral coupling attachment clearance 224 along a portion of the circumference thereof. A lateral coupling attachment surface 222 is defined by the interior surface of the lateral coupling formation 220. The lateral coupling attachment clearance 224 is sized to enable the cart handle 14 to pass therethrough, into the lateral coupling attachment surface 222. The cart caddy assembly 200 further includes a longitudinal coupling formation 230 located along each short edge 214; having a longitudinal orientation along each side portion thereof. Similarly, each longitudinal coupling formation 230 is preferably designed having a "C" shaped cross section. The "C" shape is defined by a circular or elliptical shape having a longitudinal coupling attachment clearance 234 along a portion of the circumference thereof. A longitudinal coupling attachment surface 232 is defined by the interior surface of the longitudinal coupling formation 230. The longitudinal coupling attachment clearance 234 is sized to enable the cart handle 14 to pass therethrough, into the longitudinal coupling attachment surface 232.

At least one hand clearance 216 is formed between a forward edge of the lateral coupling formation 220 and a servicing portion of the cart caddy body 210. A outer lateral coupling formation coupling tab 270 is located on each side of the hand clearance 216, providing structural connectivity between the servicing portion of the cart caddy body 210 and the lateral coupling formation 220. An optional central lateral coupling formation coupling tab 272 may be integrated into the cart caddy body 210, defining a pair of hand clearances 216. A series of finger registration ridges 218 can optionally be included on the forward exterior surface of the lateral coupling formation 220 to increase comfort to the individual pushing the cart.

Each longitudinal coupling formation 230 is attached to the cart caddy body 210 by a respective longitudinal coupling formation coupling tab 274. The longitudinal coupling formation 230 is oriented to mate with the forward directing portion of the cart handle 14. The longitudinal coupling formation 230 is arranged having a central axis thereof matching the central axis of the respective section of the cart handle 14.

The cart caddy body 210 can include at least one cup holder 240. The cup holder 240 are preferably located proximate one or both distal lateral ends of the cart caddy body 210 and of a depth allowing the carts 10 to properly nest. The cup holder 240 can include features to accommodate shapes and sizes of a variety of drink containers. The sidewall of the cup holder 240 can be shaped having a parallel interior surface of a tapering interior surface. A reduced diameter cup holder section 242 can be provided at a lower portion of the cup holder 240 to accommodate smaller diameter drink containers. An optional cup holder base 246 may be included enclosing a base portion of the cup holder 240. A cup holder drainage orifice 244 may be included in the cup holder base 246 aiding in removal of any collecting condensation or other fluids.

A tray recess 250 is preferably integrated into a central location of the cart caddy body 210. The tray recess 250 is formed including a pair of lateral walls 256 arranged parallel to the lateral coupling formation 220, a pair of longitudinal walls 258 spanning between the pair of lateral wall 256 and a base portion 259 provided along a lower perimeter formed by the lateral walls 256 and longitudinal walls 258. The tray recess 250 is designed having a depth allowing the carts 10 to properly nest. At least one tray recess drainage orifice 254 may be included in the base portion 259 aiding in removal of any collecting condensation or other fluids.

An organizer section 262 (FIG. 8) may be integrated into the cart caddy body 210. The organizer section 262 is provided having a shallow containing section. An organizer cover 260 can be removably attached covering the organizer section 262. The organizer section 262 can be provided to retain small objects for the consumer, placement of marketing paraphernalia by the cart provider, and the like. The organizer cover 260 can be transparent, translucent, or opaque depending upon the desired application.

An optional marketing fascia 226 can be integrated into the lateral coupling formation 220 for inclusion of an indicia. The indicia can be applied to the marketing fascia 226 by printing, embossing, labeling, and the like. The indicia can be a message from the retailer, a manufacturer, a marketing company, the cart caddy manufacturer, and the like. The marketing fascia 226 can include a means for changing the indicia as desired, allowing for interchangeable marketing.

Figure 8:
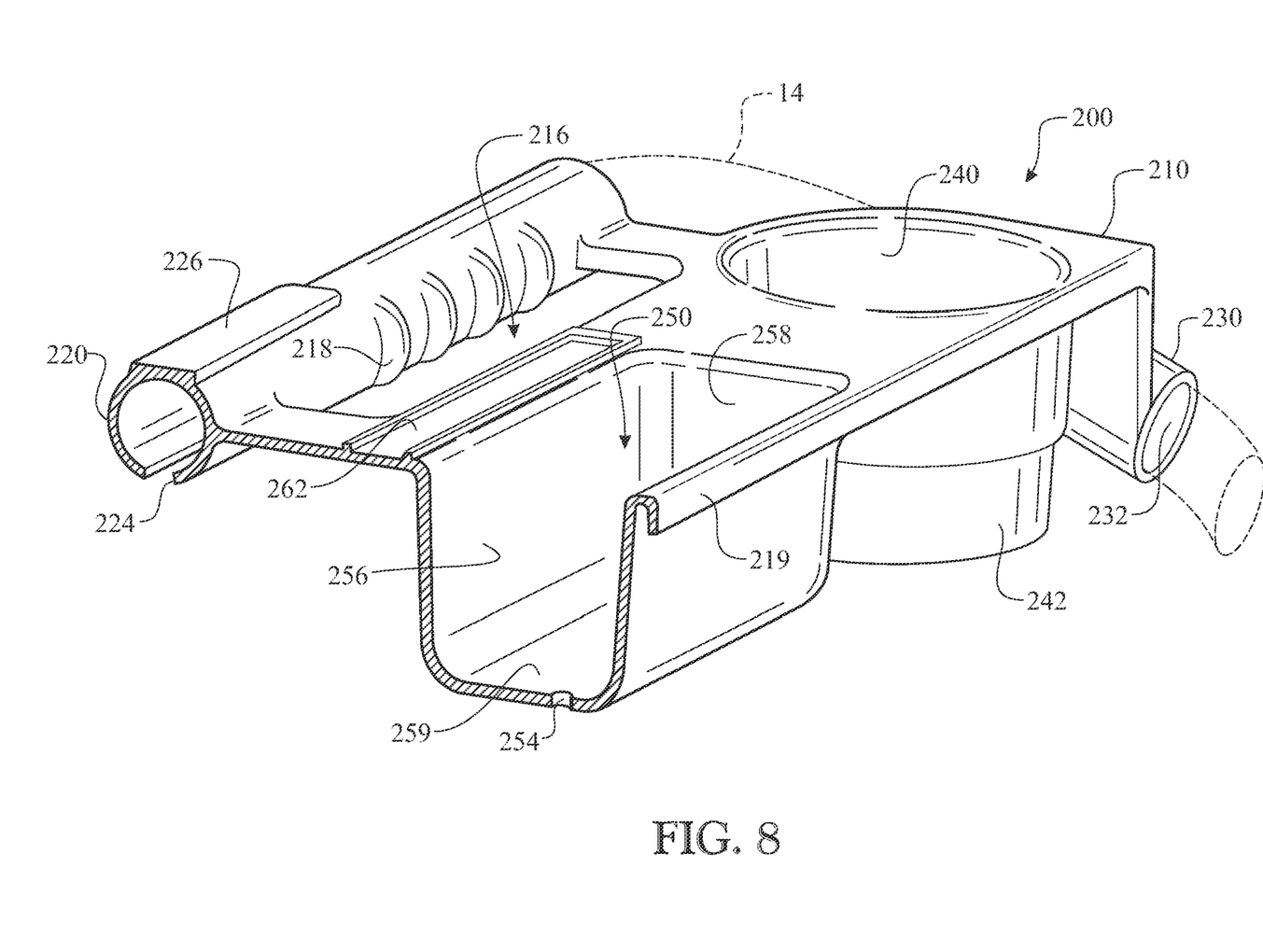
FIG. 8 is a sectioned isometric view of the cart caddy assembly of FIG. 2, the section being taken along section 8--8 of FIG. 7.
Figure 9:
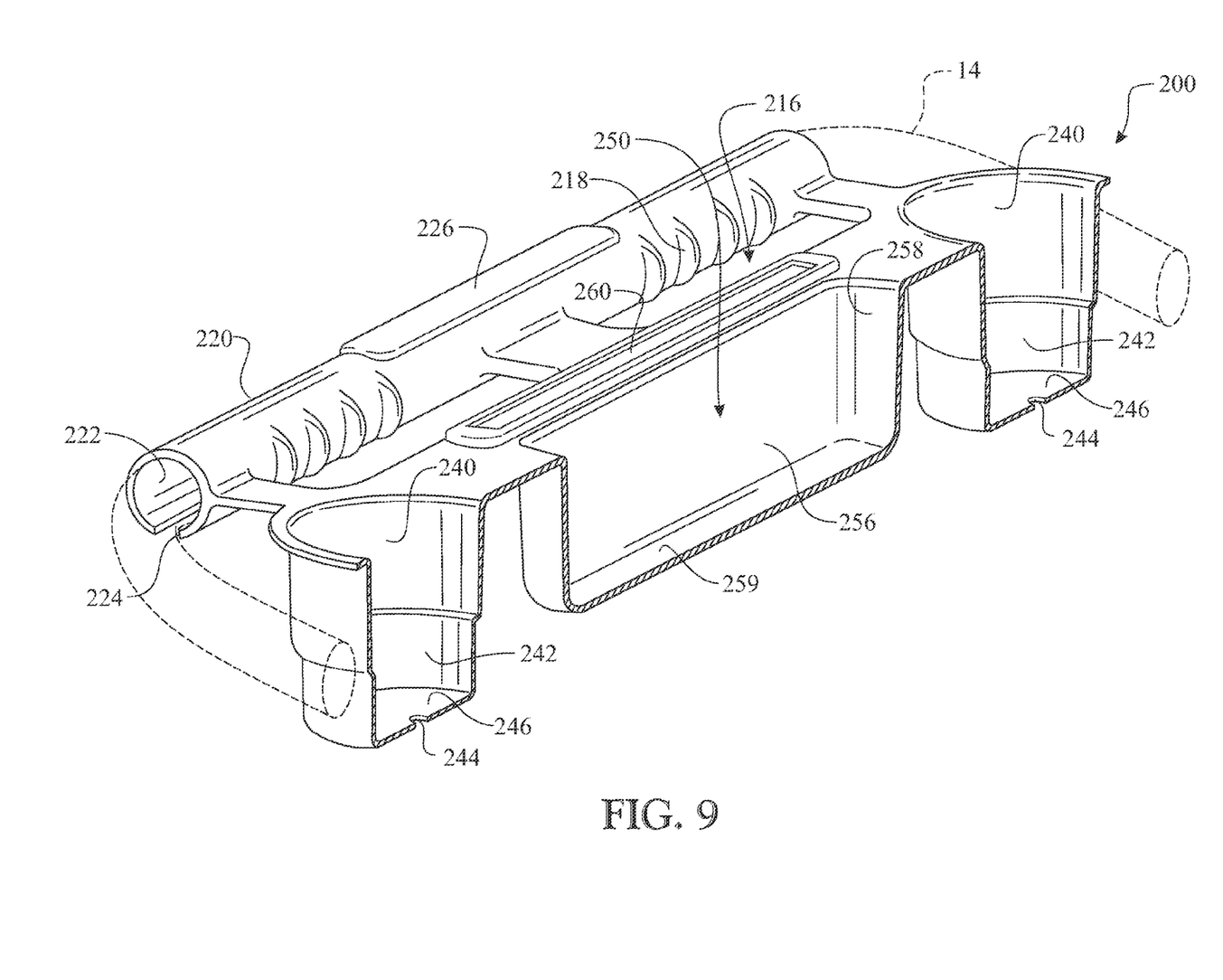
FIG. 9 is a sectioned isometric view of the cart caddy assembly of FIG. 2, the section being taken along section 9--9 of FIG. 7.

The cart caddy body 210 can include reinforcement features, such as a structural support beam 219 as illustrated in FIG. 8.

As shown, it is preferred that the cart caddy assembly 200 be of a unitary construction. The cart caddy assembly 200 is preferably fabricated using an injection molding process. The cart caddy assembly 200 is preferably fabricated of a molded colored plastic. The surface can be smooth, textured, or a combination thereof. The cart caddy body 210 is preferably designed to maintain a height that is approximate to or tower than the lateral coupling formation 220. This minimizes any potential interference of the cart caddy body 210 when the consumer is shopping and more specifically placing goods into the shopping cart 10.

Since many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What I claim is:

1. A shopping cart caddy comprising:
   a caddy body having a pair of elongated edges and a pair of short edges, wherein the elongated edges are arranged perpendicular to and span between the pair of short edges;
   a lateral coupling formation extending rearward from a rear elongated edge of the body, the lateral coupling formation having a c-shaped cross sectional shape of a size, and orientation to be removably coupled to a lateral segment of a shopping cart handle;
   at least one longitudinal coupling formation, each of the at least one longitudinal coupling formation extends sideward from the respective short edge[s] of the body, the at least one longitudinal coupling formation having a c-shaped cross sectional shape of a size and orientation to be removably coupled to a side segment of a shopping cart handle; and
   a storage container formed within the edges of the body;
   wherein the caddy body is supported by coupling the lateral coupling formation to the lateral segment of the shopping cart handle and by coupling each of the at least one longitudinal coupling formation to the respective side segment of the shopping cart handle.

2. A shopping cart caddy as recited in claim 1, the caddy further comprising at least one cup holder formed within the caddy body at a position proximate a lateral end of the body.

3. A shopping cart caddy as recited in claim 2, the cup holder defined having a depth, wherein said depth enables a pair of shopping carts to nest when the shopping cart caddy is assembled to the cart handle.

4. A shopping cart caddy as recited in claim 1 further comprising at least one hand clearance, said at least one hand clearance defined by an aperture integrated into the caddy body at a location adjacent to and forward of the lateral coupling formation.

5. A shopping cart caddy as recited in claim 4 further comprising a plurality of finger registration ridges, said plurality of finger registration ridges are located within said at least one hand clearance, extending forward from a forward edge of said lateral coupling formation.

6. A shopping cart caddy as recited in claim 1, the storage container further defined by:
   a pair of lateral walls arranged parallel to the lateral coupling formation;
   a pair of longitudinal walls spanning between distal edges of the pair of lateral wall; and
   a base portion provided along a lower perimeter formed by the lateral walls and longitudinal walls.

7. A shopping cart caddy as recited in claim 6, the storage container defined having a depth, wherein said depth enables a pair of shopping carts to nest when the shopping cart caddy is assembled to the cart handle.

8. A shopping cart caddy comprising:
a caddy body having a pair of elongated edges and a pair of short edges, wherein the elongated edges are arranged perpendicular to and span between the pair of short edges;
a lateral coupling formation extending rearward from a rear elongated edge of the body, the lateral coupling formation having a c-shaped cross sectional shape of a size, and orientation to be removably coupled to a lateral segment of a shopping cart handle;
at least one longitudinal coupling formation, each of the at least one longitudinal coupling formation extends sideward from the respective short edge[s] of the body, the at least one longitudinal coupling formation having a c-shaped cross sectional shape of a size and orientation to be removably coupled to a side segment of a shopping cart handle;
a pair of cup holders formed within the caddy body, each cup holder being located adjacent to a respective lateral end of the body; and
a storage container formed within the edges of the body;
wherein the caddy body is supported by coupling the lateral coupling formation to the lateral segment of the shopping cart handle and by coupling each of the at least one longitudinal coupling formation to the respective side segment of the shopping cart handle.

9. A shopping cart caddy as recited in claim 8, each cup holder defined having a depth, wherein said depth enables a pair of shopping carts to nest when the shopping cart caddy is assembled to the cart handle.

10. A shopping cart caddy as recited in claim 8 further comprising at least one hand clearance, said at least one hand clearance defined by an aperture integrated into the caddy body at a location adjacent to and forward of the lateral coupling formation.

11. A shopping cart caddy as recited in claim 10 further comprising a plurality of finger registration ridges, said plurality of finger registration ridges are located within said at least one hand clearance, extending forward from a forward edge of said lateral coupling formation.

12. A shopping cart caddy as recited in claim 8, the storage container further defined by:
a pair of lateral walls arranged parallel to the lateral coupling formation;
a pair of longitudinal walls spanning between distal edges of the pair of lateral wall; and
a base portion provided along a lower perimeter formed by the lateral walls and longitudinal walls.

13. A shopping cart caddy as recited in claim 12, the storage container defined having a depth, wherein said depth enables a pair of shopping carts to nest when the shopping cart caddy is assembled to the cart handle.

14. A shopping cart caddy as recited in claim 13, each cup holder defined having a depth, wherein said depth enables a pair of shopping carts to nest when the shopping cart caddy is assembled to the cart handle.

15. A shopping cart caddy comprising:
a caddy body having a pair of elongated edges and a pair of short edges arranged perpendicular to and spanning between the pair of elongated edges;
a lateral coupling formation extending rearward from a rear elongated edge of the body, the lateral coupling formation having a c-shaped cross sectional shape of a size, and orientation to be removably coupled to a lateral segment of a shopping cart handle;
a pair of longitudinal coupling formations, each of the at least one longitudinal coupling formation extends sideward from the respective short edge[s] of the body, each longitudinal coupling formation having c-shaped cross sectional shape of a size and orientation to be removably coupled to a side segment of a shopping cart handle;
a pair of cup holders formed within the caddy body, each cup holder being located adjacent to a respective lateral end of the body; and
a storage container formed within the edges of the body.

16. A shopping cart caddy as recited in claim 15, each cup holder defined having a depth, wherein said depth enables a pair of shopping carts to properly nest when the shopping cart caddy is assembled to the cart handle.

17. A shopping cart caddy as recited in claim 15 further comprising at least one hand clearance, said at least one hand clearance defined by an aperture integrated into the caddy body at a location adjacent to and forward of the lateral coupling formation.

18. A shopping cart caddy as recited in claim 17 further comprising a plurality of finger registration ridges, said plurality of finger registration ridges are located within said at least one hand clearance, extending forward from a forward edge of said lateral coupling formation.

19. A shopping cart caddy as recited in claim 15, the storage container further defined by:
a pair of lateral walls arranged parallel to the lateral coupling formation;
a pair of longitudinal walls spanning between distal edges of the pair of lateral wall; and
a base portion provided along a lower perimeter formed by the lateral walls and longitudinal walls.

20. A shopping cart caddy as recited in claim 19, the storage container defined having a depth, wherein said depth enables a pair of shopping carts to nest when the shopping cart caddy is assembled to the cart handle.

* * * * *